Figure 1:
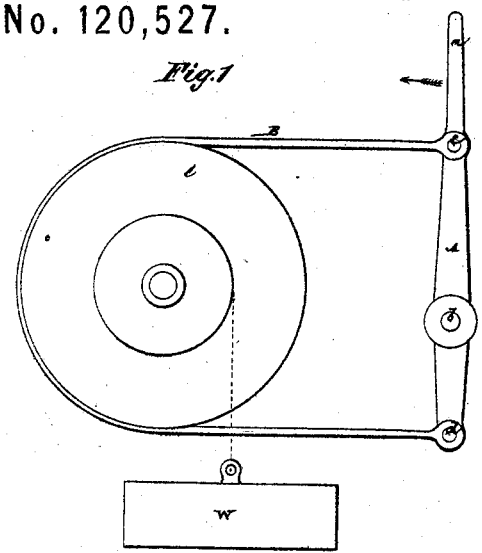

Robert David Napier. Imp't in Differential Brakes.

No. 120,527.

2 Sheets--Sheet 1.

Patented Oct. 31, 1871.

2 Sheets--Sheet 2.

*Robert David Napier. Impt in Differential Brakes.*

No. 120,527. Patented Oct. 31, 1871.

Witnesses.

Robert David Napier
per Byron Cambly
Attorneys

UNITED STATES PATENT OFFICE.

ROBERT DAVID NAPIER, OF LIMEHOUSE, ENGLAND.

IMPROVEMENT IN BRAKES FOR MACHINERY.

Specification forming part of Letters Patent No. 120,527, dated October 31, 1871.

*To all whom it may concern:*

Be it known that I, ROBERT DAVID NAPIER, of Limehouse, in the county of Middlesex, England, have invented a new and useful Improvement in Differential Brakes, of which the following is a full, clear, and exact description, reference being had to the accompanying drawing forming part of this specification.

My improved brake is not restricted to any particular purpose or application, and may be used either for arresting or for giving motion. Said brake has a differential action, similar to that for which Letters Patent No. 93,469 of the United States were issued to me on the 10th day of August, 1869; hence I style this invention an improvement on differential brakes. By a differential brake I mean a contrivance by which a band is made to press on a wheel in such a way that the friction of the two, which is caused by turning the wheel in one direction, increases the pressure of the band on the wheel, and likewise in such a way that the same action that moves the one end of the band round the wheel in one direction moves the other end, or slacks or allows it to move in the same circular direction, but at a different rate. Usually I prefer to effect this by means of connecting, directly or otherwise, the ends of the band which I call the brake-band to a lever, straight or bent, which I call the differential lever, and whose fulcrum I call the differential fulcrum. By brake-band I mean any strap, rope, chain, ring, or segment or segments of a ring employed for the purpose specified above, and the differential fulcrum may be either a joint, or any third position of the differential lever taking the place of a joint, of which the other two positions are the places to which the brake-band is connected.

My invention comprises an arrangement or arrangements for making friction-brakes self-holding or partially self-holding, without requiring to have both of the joints by which the brake-band is connected to the differential lever on the same side of its fulcrum, as is required in the brake patented by me on the 10th day of August, 1869, as before cited. For the purpose stated I place the joints by which the brake-band is connected to the differential lever on different sides of its fulcrum at different distances from it, and in such relative positions that the strains on the joints tend to turn the lever in opposite directions round its fulcrum. One advantage of this arrangement is that the differential fulcrum may be at any desired distance from the brake-wheel. Another advantage is that a very much smaller brake-wheel can be used than is otherwise practicable when it has to carry much strain, for when the brake-wheel is small and has to bear much strain the joints have to be so large that if they are on the same side of the fulcrum they require to be closer together than it is practicable to place them.

Figure 2:
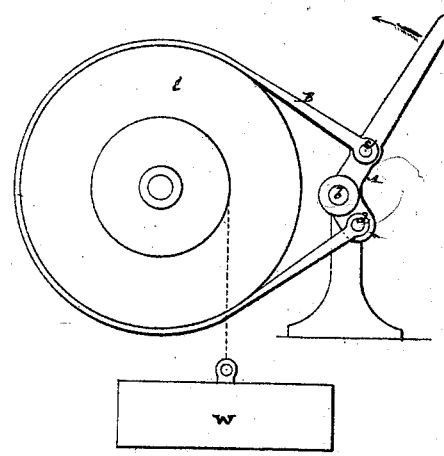
Figure 3:
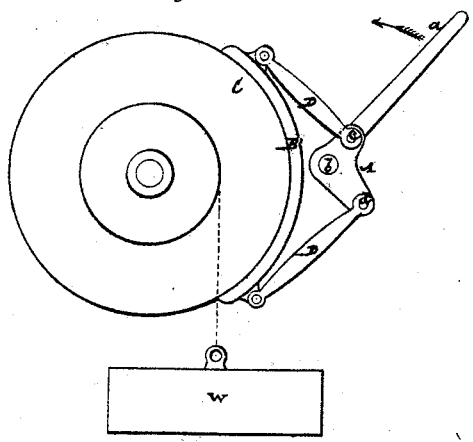
Figure 4:
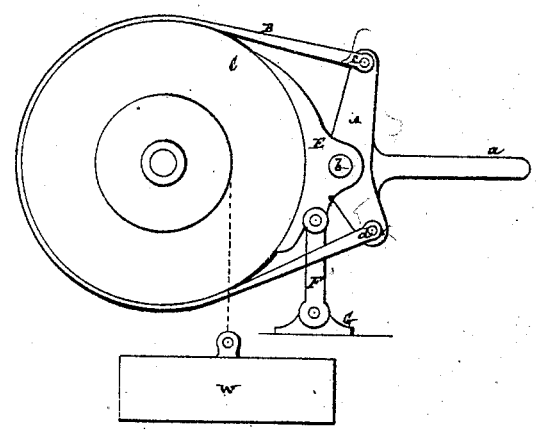
Figure 5:
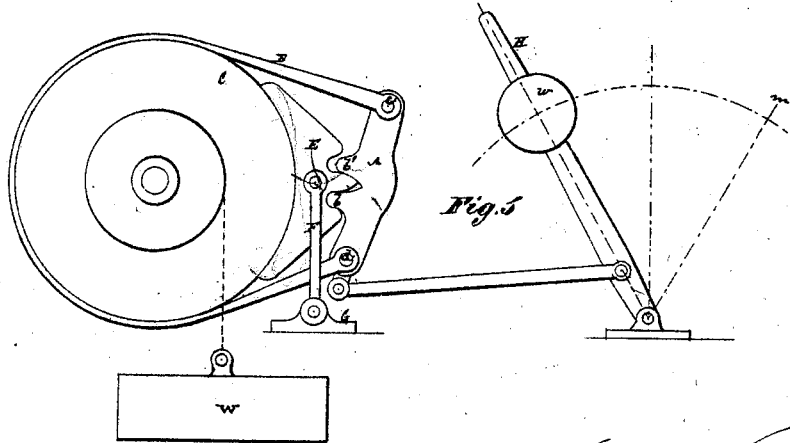
Figure 7:
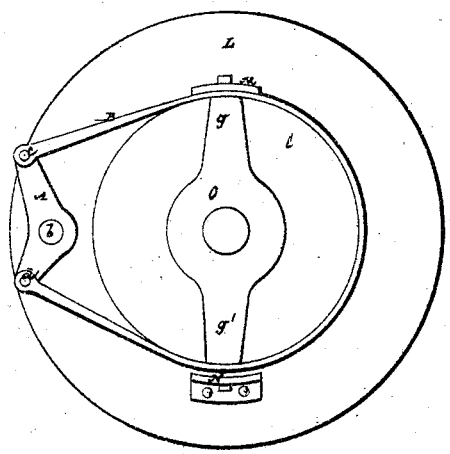
Figure 6:
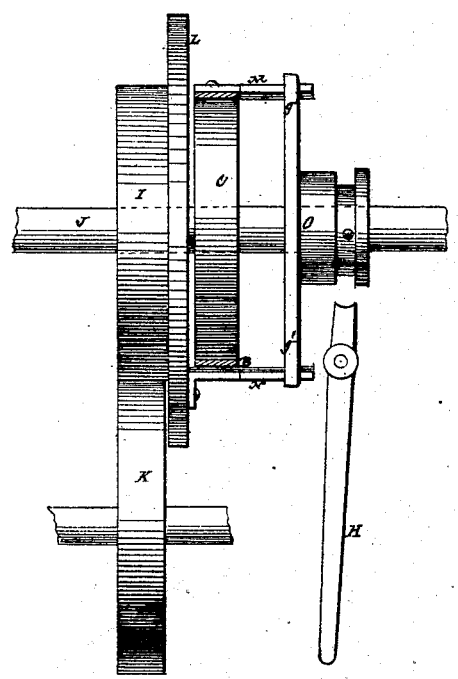
Figure 8:
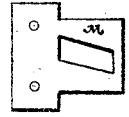

In the accompanying drawing, Figures 1 and 2 represent diagrams or views in elevation, showing my improved brake under two similar modifications or forms of applying it, and in which its action is illustrated by holding in suspension a weight or weights. Fig. 3 is a like view of another modification, showing a segment or shoe as substituted for a band to establish the friction; Fig. 4, a modification, in which a chock to transmit strain, as hereinafter described, is combined with the differential lever of the brake; Fig. 5, a modification, showing a shifting arrangement of the fulcrum of the differential lever for reversing the action of the brake. Figs. 6, 7, and 8 are views illustrating the application of the differential lever to a friction-clutch for communicating power or rotary motion.

Similar letters of reference indicate corresponding parts throughout the several figures.

In Figs. 1 and 2, A represents the differential lever of the brake; *a*, its handle portion; *b*, its differential fulcrum; and *c d*, the joints or points of attachment on opposite sides of the fulcrum and at different distances therefrom, for the two ends of the friction or brake-band B, which is applied to a wheel, C, to hold in suspension a weight, W, carried by a rope or chain passed round a drum fast to the axle of the wheel. By moving the handle *a* in direction of the arrow *x* the brake will be slackened and the weight W be allowed to descend. I prefer that the differential lever A should be so shaped that the strain at the joints *c* and *d* should act at nearly right angles to the arms *c b* and *d b* of the lever. Fig. 2 represents the arrangement which I, in both cases, prefer.

Another advantage obtainable from placing the joints on different sides of the fulcrum is that the brake-band may be a semicircular or smaller segment placed between the brake-wheel and the differential lever or bell-crank. This arrangement leaves one side of the brake-wheel clear, so that the brake can be applied to the wheels of railway and other carriages. Fig. 3 represents such an arrangement, the weight W being held suspended by a self-holding brake of this description. In this modification or arrangement the movement of the handle $a$ of the differential lever A in direction of the arrow $x$ would allow the weight W to descend, as in Figs. 1 and 2; but the strains on the rods D D, which connect the brake-band or shoe or segment B with the lever at the point $c\ d$, are compressive and not tensile.

A useful application of self-holding brakes constructed as above described is to obtain what I call a self-acting revolving bit for riding and veering out by, intended mainly for the use of vessels provided with capstans. For the object in view I employ a barrel similar to a windlass-barrel, arranged for taking several turns, and curved so as to deflect the chain as the barrel revolves; or otherwise a chain-wheel for taking a portion of a turn of a chain, and provided with stops to prevent the chain from passing over it without turning the wheel. The barrel or wheel is actuated by a self-holding brake; such, for example, as that shown at Fig. 3, which allows it to revolve in one direction, but not the other till the brake is slacked. The barrel or wheel is placed between the hawse-pipe and the capstan, the chain is passed several times round the barrel or partly round the wheel, as the case may be, and one part or end being passed through the hawse-pipe, the other, for the purpose of being hove in, is taken to the capstan. When heaving in the barrel or chain-wheel turns round in the direction that frees the brake, and should any accident happen to the capstan the chain will be prevented from running out by means of the barrel or chain-wheel being held in that direction by the differential brake; and when it is desired to veer out the chain is taken off the capstan and the brake is slacked as much as desired. By this arrangement the capstan requires no pawls, and is, therefore, always free to work in either direction. Many accidents have happened through the pawls of capstans being left out of gear. These would be prevented by the use of the self-holding revolving bit.

A very advantageous modification or arrangement in many cases is that shown in Fig. 4, where a chock, E, is introduced to transmit the strain on the differential fulcrum to the brake-wheel, and a pair of links, F, are jointed to the chock E and to a standard, G. By this arrangement the strains on the brake-band and differential lever are much reduced, and the strength required to mount the standard G is not nearly so much as what would be required to hold the differential fulcrum in its position. In the preceding arrangements the direction in which the brakes are self-holding is permanent; but it is frequently desirable that the action should be capable of being reversed, as, for instance, when applied to capstans intended for heaving both ways. For this object I make a twofold differential fulcrum in the manner shown in Fig. 5, where A is the differential lever, as in the previous cases, but which is operated by an independent lever or handle, H. If this handle H, on which is a small weight, $w$, is situated as in the drawing, then $b$ bears on the chock E so as to become the differential fulcrum, and the brake is self-holding in the direction to keep the hoisted weight W in suspension; but if the handle H be moved over to $m$ then $b'$ becomes the differential fulcrum and the self-griping direction is reversed; and if the handle be placed in an intermediate or upright position the brake-wheel will be free to turn in any direction.

Another application of the invention consists in using a differential brake for the purpose of obtaining what I call a differential friction-clutch for communicating power and rotary motion to machinery that requires to be occasionally started and stopped, especially to machinery liable to violent shocks, such, for instance, as rolling-mills and dredging-machines. In these arrangements a differential lever is not pulled backward and forward, but is connected by its fulcrum to a crank or wheel which revolves in a continuous direction round the same central line as that of the brake-wheel, so that the differential fulcrum describes a circle concentric with but of larger diameter than the brake-wheel. Figs. 6, 7, and 8 relate to such an application of the invention. Fig. 6 showing a clutch of the description named partly in section. I is a spur-wheel running loose upon a shaft, J, driven continuously by a steam-engine or otherwise. K is a wheel gearing with the wheel I, and forming part of a machine which it is desired to throw into and out of action from time to time without concussion. L is a disk forming part of the wheel I. It, together with some of the other parts, is shown in end view at Fig. 7. This disk L carries the fulcrum $b$ of the differential lever A, to the ends of which, as at $c\ d$, the brake-band B is attached. This band encircles a pulley, C, which is fast upon the shaft J. O is a boss, which can both slide and turn upon the shaft J. It has two arms, $g\ g$, upon it, the extremities of which pass through slotted plates M N. The plate M, which is shown separately in plan at Fig. 8, is fixed on the brake-band. The other plate N is similar, but it is fixed on the disk L. The slots in the plates M and N are inclined, as is shown. Thus it will be seen that, by moving the boss O along the shaft J by means of its lever handle H, the differential lever A, can be caused to rock on its fulcrum and the brake-band tightened or slackened. When it is slack the machine in connection with the wheel K will be out of gear, and as the band is tightened by moving the handle H the machine will be gradually put in motion. If it is desired that the friction-clutch should give way should an undue strain come on the machine which is driven, an adjustable stop may be employed to limit the motion of the differential lever A or of the hand-lever H. By the use of a differential friction-clutch machinery may be thrown into or out of gear with great ease and safety, and because the griping power is self-acting, or as nearly so as may be desired, very little force is required to keep the clutch in gear as compared with that required when driving machinery by common frictional gearing. These clutches possess all the properties of a friction-cone for limiting the strain to be transmitted through them, and have much greater certainty of action, for every time the clutch is thrown out of gear the friction surfaces are changed, so that they never get any chance of setting fast, and the amount of power that can be transmitted through them may be regulated by the turning of a single bolt either when the clutch is in or out of gear.

My improved differential brake may also be used for various driving or rotating purposes, as for rotating a windlass barrel or drum of a hoisting apparatus, by vibrating the differential lever to move the wheel to which the brake-band is applied, a stop-brake, which may also be constructed upon a differential principle of action, serving to hold the wheel or drum from slipping or rotating backward during the back stroke of the driving or hoisting brake, which operates only during its alternate movements in the same direction by the friction of the brake-band on the wheel to communicate motion to the wheel.

What is here claimed, and desired to be secured by Letters Patent, is—

The combination of the differential lever A with the brake-band B and wheel C, when said lever has its joints or points of attachment $c$ $d$ and fulcrum $b$ arranged, in relation with each other and the band, substantially as specified, and whereby the strain on the joints is thrown upon different sides of the fulcrum of the lever, and so that the same action that moves the one end of the band round the wheel moves the other end in the same circular direction, but at a different rate, as herein set forth.

ROBERT DAVID NAPIER.

Witnesses:
WM. B. MACWHINNIE,
ROBT. COLTON. (79)